(No Model.)
R. KENNEDY.
TRANSFORMATION AND DISTRIBUTION OF ELECTRIC ENERGY.
No. 378,321. Patented Feb. 21, 1888.
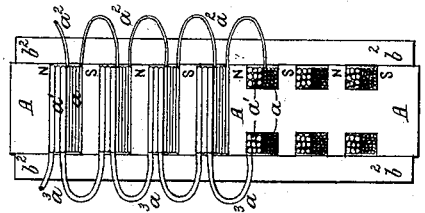
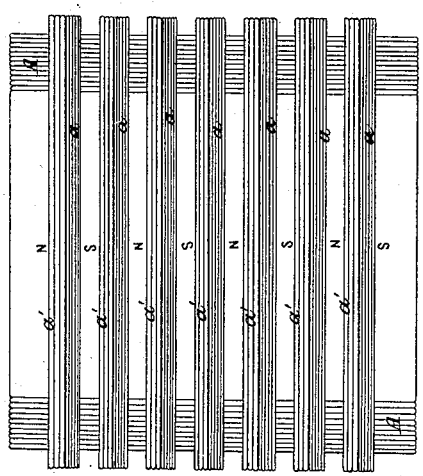
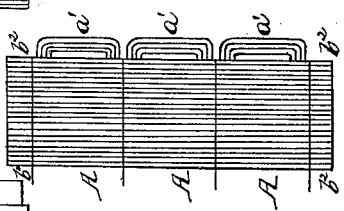
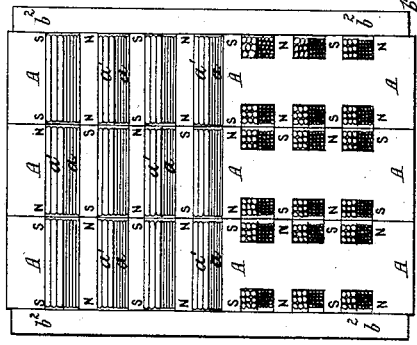
Witnesses.
William D. Conner
John E. Parker.
Inventor:
Rankin Kennedy
by his Attorneys
Howson & Son

UNITED STATES PATENT OFFICE.

RANKIN KENNEDY, OF GLASGOW, COUNTY OF LANARK, SCOTLAND, ASSIGNOR OF ONE-HALF TO ROBERT DICK, OF SAME PLACE.

TRANSFORMATION AND DISTRIBUTION OF ELECTRIC ENERGY.

SPECIFICATION forming part of Letters Patent No. 378,321, dated February 21, 1888.

Original application filed December 29, 1886, Serial No. 222,930. Divided and this application filed April 30, 1887. Serial No. 236,649. (No model.)

*To all whom it may concern:*

Be it known that I, RANKIN KENNEDY, a subject of the Queen of Great Britain and Ireland, and residing at Glasgow, in the county of Lanark, Scotland, have invented certain Improvements in and Relating to the Transformation and Distribution of Electric Energy, of which the following is a specification.

Secondary generators employed for the transformation of alternating currents of electricity from currents of high potential and small volume to currents of low potential and large volume, or vice versa, are not self-regulating as at present constructed, and no definite plan or method of constructing them with a view to perfect self-regulation has hitherto been described or put in practice.

To obtain the maximum self and mutual induction in secondary generators for the purpose of self-regulation, the conductors are wound, according to my invention, in numerous short lengths or small sections, each of a few turns, and each section with an independent short magnetic circuit, so that they lie nearly equally close to the iron core and outer sheathing throughout their length, and each division of the magnetic iron organ portion with its sections of primary and secondary conductors thus forms an independent small secondary generator, and these small secondary generators are coupled up to form one large secondary transformer. The mutual induction and the self-induction of the conductors are here at a maximum, as I have found that to obtain a maximum of self and mutual induction the conductors throughout their lengths must lie parallel and as near as possible at a uniform distance apart from each other and from the iron organ or core of the generator, and both conductors symmetrically placed within or adjacent to the iron magnetic organ of the secondary generator.

In an application for a patent filed by me December 29, 1886, Serial No. 222,930, I have shown, described, and claimed a construction of transformer or generator embodying the above-described improvements. The present application is a division of my said application No. 222,930, and illustrates another structural form of my previous invention.

Figures 1 and 2 are an end view, partly in section, and a plan, respectively, of a flat-plate form of secondary generator of alternating currents constructed in accordance with the improvements of my invention. Fig. 3 is an end view, partly in section, of a triplication of the secondary generator shown in Figs. 1 and 2—that is, one laid on the top of another; but any number may be so piled or arranged over each other to form one large transformer. Fig. 4 is a partial side view of the transformer, showing the lamination of the cores and top and bottom plates.

In the arrangement of my improvements shown in Figs. 1 and 2 the iron magnetic core organ or portion A of the secondary generator is constructed of iron plates having teeth N and S formed on two opposite edges or sides; and these plates A are built together, with thin paper or other insulating material between them, or having each plate coated with such to form a block with numerous long narrow channels or spaces on both edges right across the whole block, as indicated at A A in Fig. 2. Into these channels are wound or laid the primary and secondary insulated conducting copper wires $a$ $a'$, in short sections, either side by side, as shown, or it might be the one over the other; and the primary sections $a$ are wound and have their terminal ends $a^2$ connected, so that the projecting teeth N and S between the channels form north and south poles alternately when a current flows in it; and the terminal ends $a^3$ of the secondary sections $a'$ are connected up in parallel or series order suitable for the work to be done. Finally, this block A, with the two conductors $a$ $a'$ in the channels, is laid between two blocks of iron, $b^2$, formed of thin soft-iron plates built and secured together on edge in the same direction as the plates A A, with thin paper or other insulation between each of them.

To form large secondary generators or transformers in accordance with the arrangement last described of this invention, I pile two, three, or more of the flat magnetic blocks A, with their coiled transformers, one upon the other, as shown in Fig. 3, with coil $a$ and $a'$ opposite coil $a$ and $a'$, respectively, and tooth opposite tooth, and with poles of opposite polarity, N and S, facing each other, S and N, with a block or inclosing sheathing, $b^2$, formed of iron plates, on top and bottom of the whole pile, as shown particularly in Fig. 3.

The most efficient method of winding the two conductors $a$ $a'$ of these new transformers of alternating currents would be to have one turn of primary wire $a$ and ten turns of secondary wire $a'$ in each section for a transformer to raise a low potential current to ten times its intensity, and, vice versa, have one turn of secondary wire $a'$ and ten turns of primary wire $a$ when the potential has to be reduced in these transformers from the higher to the lower potential. In these forms of secondary generators the conductors $a$ and $a'$ are throughout their whole length nearly equally close to the iron-core portion A and the iron sheathing $b^2$ $b^2$, and the path of the lines of force through these iron portions is of a very small resistance, being very short. Consequently I obtain a maximum of mutual induction and a maximum of self-induction.

The maximum of mutual induction between primary and secondary conductors $a$ $a'$ is obtained when the full load or work for which the secondary generator is constructed is being performed by the secondary currents. The maximum of self-induction in the primary conductor $a$ is obtained when no work is being done in the secondary circuit $a'$, and thus I get self-regulation in my transformers when the work is being done in the secondary circuit $a'$. The self-induction in the primary conductor $a$ is so great that it is able to set up a counter or opposing electro-motive force to the primary electro-motive force nearly equal thereto, and therefore automatically stops the inflow of electric energy from the main conductor. As work is put on the secondary circuit $a'$ by placing lamps or other translating devices in parallel connection therewith, the self-induction is reduced, and a corresponding inflow of energy takes place in the primary conductor $a$. A corresponding increase in mutual induction follows, and thus the supply is regulated to meet the demand within certain limits. Beyond these limits I obtain a supply to meet the demand by connecting together any number of the small generators.

The small generators can be grouped together in many ways known to electricians, as cells of electric batteries are grouped for the various purposes to which the currents are applied.

It is to be understood that these transformers of alternating currents of electric energy, although described as secondary generators, may also be used as main transformers when placed between the dynamo-electric machines and the main conductors for transforming currents of low potential into currents of high potential in the main lines by having the primary conductor as a short wire and the secondary conductor as a long wire.

What I claim is—

1. A secondary generator or transformer of alternating currents of electric energy, consisting of a number of thin iron plates built together with insulating material between them to form a central magnetic iron block, and having projecting teeth to form magnetic poles of north and south polarity on both their edges, with channels between the teeth to receive the sections of the primary and secondary conductors, the whole being inclosed between two flat blocks of iron plates secured together on edge with insulating material between them, substantially as herein set forth.

2. Two or more flat magnetic blocks forming with their coils transformers and laid one upon the other, with coil opposite coil and tooth opposite tooth, and with poles of opposite polarity facing each other, in combination with an inclosing sheathing formed of laminated iron plates on top and bottom of the whole.

In testimony whereof I have signed my name to this specification in the presence of two subscribing witnesses.

RANKIN KENNEDY.

Witnesses:
W. R. M. THOMSON,
JOHN SIME.